No. 826,931. PATENTED JULY 24, 1906.
M. L. GORDON.
BALL BEARING FOR HYDRAULIC GIANTS.
APPLICATION FILED JUNE 19, 1905.
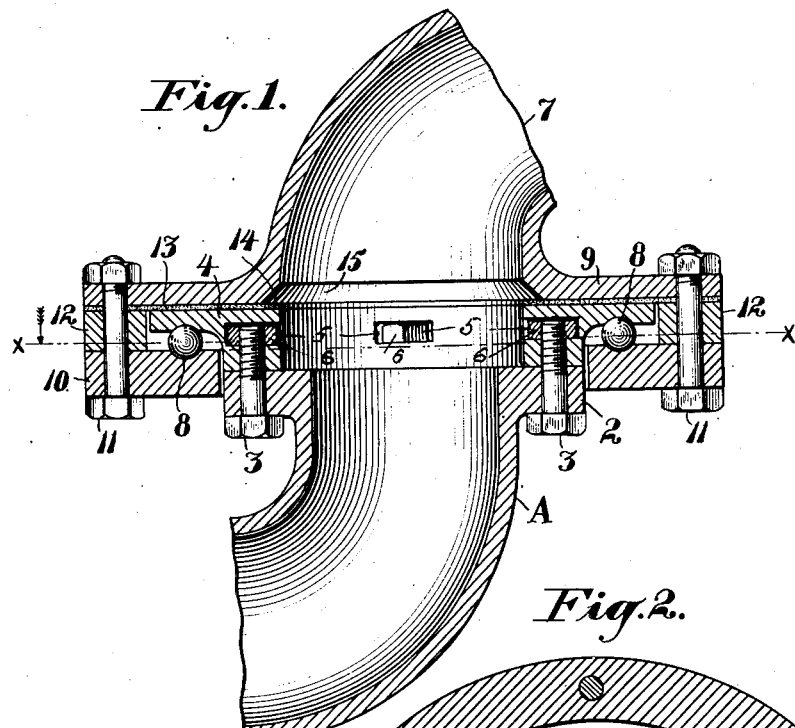
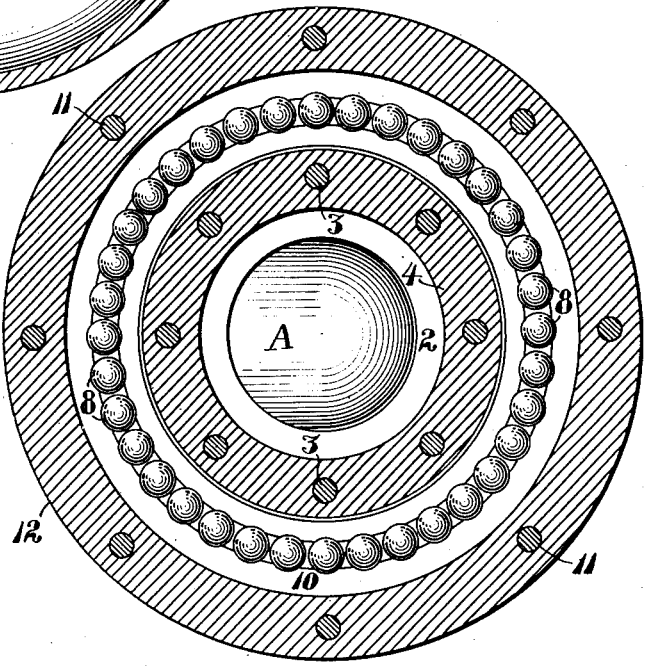
Witnesses:—
Inventor,
Morris L. Gordon
By Geo. H. Strong, atty

UNITED STATES PATENT OFFICE.

MORRIS L. GORDON, OF SEIAD VALLEY, CALIFORNIA.

BALL-BEARING FOR HYDRAULIC GIANTS.

No. 826,931.   Specification of Letters Patent.   Patented July 24, 1906.

Application filed June 19, 1905. Serial No. 265,913.

*To all whom it may concern:*

Be it known that I, MORRIS L. GORDON, a citizen of the United States, residing at Seiad Valley, in the county of Siskiyou and State of California, have invented new and useful Improvements in Ball-Bearings for Hydraulic Giants, of which the following is a specification.

My invention relates to hydraulic giants, and particularly to antifrictional joints therefor.

The invention consists of the parts and the construction and combination of parts, as hereinafter more fully described and claimed, having reference to the accompanying drawings, in which—

Figure 1 is a sectional view of my joint for hydraulic giants. Fig. 2 is a section taken on line X X of Fig. 1.

A represents a stationary pipe-section connecting with a suitable source of water-supply. This supply-pipe is often twelve or more inches in diameter and the water flowing through it under several hundred feet head.

The section A is provided with an annular flange 2, which is perforated to receive the bolts 3, by which the annulus 4 is removably secured to the top of the flange, said annulus being provided with inside radial slots 5, which intersect the bolt-holes in the annulus, with the nuts 6 seating in the slots and fitting the bolts 3, as shown.

The portion of the annulus which seats on the flange 2 is made sufficiently thick and heavy to afford a good anchorage for the bolts 3 against the tremendous thrust that the water exerts in the nozzle 7. The annulus extends out beyond and all around flange 2, and its under side is provided with an annular groove, which forms the upper race for the balls 8. The nozzle 7 is curved, like most nozzles of its class, and has an annular flange 9 to seat and turn with a sliding movement on the annulus 4. The flange 9 extends beyond the flange 2 and ring 4 and carries a wearing-ring 10, removably held to the under side of flange 9 by the bolts 11 and suitably spaced from the flange by the ring 12. The ring 10 projects in under the corresponding projecting bearing portion of ring 4 and has a groove on its upper surface, forming the lower race for the balls 8. The inside diameters of the two rings 10 12 are slightly greater than the diameters of the respective adjacent parts of flange 2 and ring 4, so that a limited lateral adjustment of ring 10 relative to ring 4 is possible to allow the balls to seat and center properly in the grooves.

Interposed between flange 9 and rings 4 and 12 and carried by and movable with the nozzle is an annular waterproof packing or plate 13, of suitable material, which rests on ring 4 and bridges the space between rings 4 and 12. This packing or cover member 13 has its inner edge substantially flush with, but not projecting over, the inside wall of the ring 4 and has an annular portion 14 of its upper surface entirely uncovered by flange 9 and completely exposed to the body of water in the nozzle.

Since the water in the nozzle is under very heavy pressure, due to the head and to the restricted character of the discharge-orifice of the nozzle, a strong pressure is brought on this exposed surface 14 to cause it to hug close to the ring 4. Consequently any leak that takes place through the joint occurs between the packing and flange 9 and not between the packing and ring 14, so that practically no water gets into the bearings, and they are protected from grit and other like destructive agencies and tendencies.

In order to expose the edge of the packing sufficiently to the internal water-pressure, the nozzle adjacent to the flange 9 is shown as cut away, as at 15.

In case any of the bearing parts become worn, as they inevitably do, it is an easy matter to replace any one of them without having to discard an expensive nozzle or a specially cast and ground pipe-section. If the lower bearing-ring 10 becomes worn, it can quickly be replaced. So can the ring 4, which latter constitutes an essentially novel feature of the invention. These rings are comparatively cheap, and by having them easily replaceable the miner can always keep his giant in good working shape with little cause or opportunity for leakage.

Having thus described my invention, what I claim, and desire to secure by Letters Patent, is—

An improved hydraulic giant having in combination a pipe-section provided with an annular flange, a nozzle-section having an annular flange about its base, a packing-annulus interposed between said flanges, said annulus having radial recesses, bolts extending between the flange of the pipe-section and the annulus, nuts fitted to the bolts and located in the radial recesses of the annulus, a wearing-ring secured to the nozzle-section and underreaching the annulus, a packing between the annulus and flange of the nozzle-section and antifriction-rollers between said annulus and the wearing-ring.

In testimony whereof I have hereunto set my hand in presence of two subscribing witnesses.

MORRIS L. GORDON.

Witnesses:
E. F. REICHMAN,
I. J. WILLARD.